April 26, 1960 E. H. WARNE 2,934,138
MEANS FOR CONTROLLING THE SUPPLY OF LIQUID
FUEL TO A GAS TURBINE
Filed Jan. 6, 1958
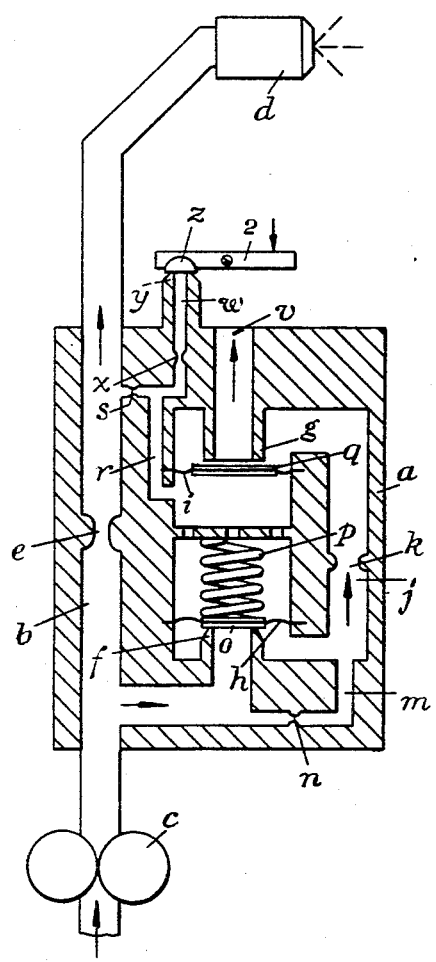
Inventor
E. H. Warne 2,934,138

MEANS FOR CONTROLLING THE SUPPLY OF LIQUID FUEL TO A GAS TURBINE

Eugene Harold Warne, Solihull, England, assignor to Joseph Lucas (Industries) Limited, Birmingham, England Application January 6, 1958, Serial No. 707,246

2 Claims. (Cl. 158—36.3)

This invention relates to means for controlling the supply of liquid fuel to a gas turbine, and has for its primary object to enable fuel to be supplied to the turbine, when starting, at a rate in excess of that required when the turbine commences to run under its own power.

A fuel control means in accordance with the invention includes a fuel supply passage for connection at its ends to a fuel pump and burner respectively and being provided with a constriction whereby a convenient fuel-pressure difference can be set up in this passage at the opposite sides of the constriction, a by-pass whereby fuel can be diverted from the upstream side of the said constriction to a sump or the inlet side of the fuel pump, and a normally closed valve at the inlet end of the by-pass which is responsive to the said fuel pressure difference for controlling the flow to the by-pass.

The accompanying drawing illustrates diagrammatically an example of a fuel control means embodying the invention.

Referring to the drawing, there is provided in a body part $a$ a fuel passage $b$ by which the fuel is conveyed from a pump $c$ to the burner $d$ in the combustion chamber of the turbine. The pump $c$ is of higher capacity than that required by the turbine when the latter is running under its own power. In the passage $b$ is formed a constriction $e$ for setting up in the fuel stream a pressure difference adequate for the purpose to be hereinafter mentioned. In the body part is formed a valve chamber having at one end a by-pass fuel inlet seating $f$ and at the other end a by-pass fuel outlet seating $g$. The chamber is divided into three compartments by a pair of flexible diaphragms $h, i$. The two ends of the chamber are interconnected by a by-pass $j$ which also is provided with a constriction $k$. The entrance end of the by-pass and also the entrance to the adjacent seating $f$ are preferably interconnected by a branch passage $m$ which may also be provided with a constriction $n$.

The diaphragm $h$ carries a closure member $o$ and is loaded by a spring $p$ which normally holds this closure member in contact with the seating $f$. The diaphragm $i$ carries a closure member $q$ which co-operates with the seating $g$. The compartment between the diaphragm is connected to the down-stream side of the constriction $e$ in the fuel passage by a branch passage $r$ which may contain a constriction $s$.

The mode of action is as follows:

When the pump is at rest the closure member $o$ is held on its seating by the spring $p$. The closure member $q$ may be in either its closed or open position. Starting of the turbine is effected by an electric motor or other power source, and the whole of the fuel output of the pump (which is driven by the turbine) is then supplied to the combustion chamber of the turbine, since during starting the fuel consumption in the combustion chamber is insufficient to render the fuel pressure difference at opposite sides of the constriction $e$ in the fuel passage $b$ adequate to effect opening of the spring-loaded closure member $o$ which is exposed at opposite sides respectively to the pressures at the upstream and downstream sides of the constriction $e$.

After ignition of the combustible mixture thus supplied to the turbine, the latter commences to work under its own power and, while accelerating, the pressure difference in the fuel passage $b$ rises sufficiently to effect opening movement of the closure member $o$. In this condition a part of the fuel supplied by the pump is diverted through the by-pass $j$ to a sump on the inlet side of the pump at a rate which is strictly proportional to the rate of fuel flow to the turbine. This proportion is determined by the ratio of the areas of the constrictions $e$ and $k$ in the fuel passage and the by-pass. In this respect it will be understood that as the closure member $q$ is exposed at opposite sides respectively to the fuel pressures at the downstream sides of the constrictions $e$ and $k$, any variation in the pressure at the downstream side of the constriction $e$ in fuel passage will cause the position of the closure member $q$ to be varied for effecting a proportional variation in the fuel pressure at the downstream side of the constriction $k$ in the by-pass. Consequently, the ratio of the areas of the constrictions $e$ and $k$ can be selected to satisfy the requirements of the turbine under working conditions, with the result that the fuel required during both starting and working conditions can be supplied by a single pump, and any possibility of the turbine fuel supply being undesirably low or high under working conditions is effectively minimised.

The purpose of the constricted passageway $m$ is simply to minimise the possibility of damage to the diaphragm $i$ as a result of high fuel pressure being exerted thereon through the passageway $r$ in the event of the fuel flow to the turbine being prevented or interrupted by, for example, a shut-off valve (not shown).

Regulation of the rate of supply of fuel to the turbine during normal working conditions may be effected in any convenient manner, such as by the action of a speed governor. For this purpose there may, for example, be provided in the body part of the means above described, a vent passage $w$ having therein a restriction $x$ and terminating in a seating $y$ which is normally closed by a closure member $z$ on a lever 2, the latter being operable by a speed governor or other means the action of which is correlated with a working condition of the turbine. Opening of the vent results in reduction of the fuel pressure acting on the underside of the diaphragm $i$, so enabling the extent of opening of the closure member $q$ to be increased by the pressure of the by-pass fuel acting on the upper side of this diaphragm.

Having thus described my invention what I claim as new and desire to secure by Letters Patent is:

1. Means for controlling the supply of liquid fuel from a fuel pump to a burner of a gas turbine, comprising in combination a fuel supply passage which is connectible at its opposite ends respectively to the pump and burner, and which is provided at a position intermediate its ends with an internal constriction whereby a fuel-pressure difference can be set up between the fuel in the passage at the downstream and upstream sides of the constriction, a by-pass having an inlet end connected to the fuel supply passage at the upstream side of the said constriction, and also having an internal constriction at a position intermediate its ends, a valve situated at the inlet end of the by-pass to control communication thereof with the fuel supply passage, and provided with a spring-loaded closure member adapted to be opened by the fuel pressure in the said passage at the upstream side of the constriction therein, a second valve situated at the other end of the by-pass to control fuel flow therefrom, and provided with a closure member adapted to be urged in the opening direction by the fuel pressure in the by-pass at the downstream side of the constriction therein, a pair of flexible diaphragms respectively carrying the closure members of the valves, the valve chamber which extends between the ends of the by-pass, and in which the diaphragms are mounted in spaced relationship to isolate the space in the chamber between the diaphragms from the by-pass, and a passageway connecting the said space to the fuel supply passage at the downstream side of the constriction in the latter so that the fuel pressure in the fuel supply passage at the downstream side of the constriction therein tends by its action on the diaphragms to oppose opening movements of the valve closure members.

2. Means according to claim 1 and having a branch passage interconnecting the by-pass and the fuel supply passage at the upstream sides of the constrictions therein, the branch passage being also provided with an internal constriction.

References Cited in the file of this patent

UNITED STATES PATENTS

| | | |
|---|---|---|
| 2,061,849 | Lee II | July 1, 1952 |
| 2,637,374 | Campbell | May 5, 1953 |
| 2,668,585 | Oestrich et al. | Feb. 9, 1954 |
| 2,806,519 | Bashford et al. | Sept. 17, 1957 |